United States Patent
Rakshit et al.

(10) Patent No.: US 9,582,577 B2
(45) Date of Patent: Feb. 28, 2017

(54) GRAPHICAL DIAGRAM HAVING ELEMENTS THAT CORRESPOND TO OBJECTS AND THAT HAVE LOCATIONS IN CORRESPONDENCE WITH APPEARANCE RELATIONSHIPS OF OBJECTS

(75) Inventors: Sarbajit K. Rakshit, Kolkata (IN); Thomas S. Mazzeo, Durham, NC (US); Barry A. Kritt, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1009 days.

(21) Appl. No.: 13/270,074

(22) Filed: Oct. 10, 2011

(65) Prior Publication Data

US 2013/0089299 A1 Apr. 11, 2013

(51) Int. Cl.
*H04N 5/775* (2006.01)
*G06F 17/30* (2006.01)
*G11B 27/34* (2006.01)

(52) U.S. Cl.
CPC ........ *G06F 17/30852* (2013.01); *G11B 27/34* (2013.01)

(58) Field of Classification Search
CPC .......................... G11B 27/34; G06F 17/30852
USPC ....................................................... 386/230
See application file for complete search history.

(56) References Cited

U.S. PATENT DOCUMENTS

| | | | |
|---|---|---|---|
| 5,778,382 A * | 7/1998 | Hatori | |
| 6,205,231 B1 | 3/2001 | Isadore-Barreca et al. | |
| 6,326,962 B1 * | 12/2001 | Szabo | 715/762 |
| 7,698,721 B2 | 4/2010 | Sakai | |
| 7,802,188 B2 | 9/2010 | Wu | |
| 2002/0028012 A1 * | 3/2002 | Honda | 382/145 |
| 2008/0276199 A1 * | 11/2008 | Hosogai et al. | 715/841 |
| 2009/0049409 A1 | 2/2009 | Leclercq et al. | |
| 2009/0049467 A1 * | 2/2009 | Robson et al. | 725/28 |
| 2009/0092374 A1 | 4/2009 | Kulas | |
| 2009/0144772 A1 | 6/2009 | Fink et al. | |
| 2009/0204608 A1 * | 8/2009 | Musgrove et al. | 707/5 |
| 2010/0070860 A1 | 3/2010 | Alkov et al. | |
| 2010/0082585 A1 | 4/2010 | Barsook et al. | |

(Continued)

OTHER PUBLICATIONS

Chang et al.: "Content-Selection Based Video Summarization", ICCE Digest of Technical Papers, International Conference on, Jan. 10-14, 2007, pp. 1-2.

(Continued)

*Primary Examiner* — William Tran
(74) *Attorney, Agent, or Firm* — Steven Bennett

(57) ABSTRACT

A video is divided into portions and has objects. Each object appears in one or more portions. A graphical diagram is generated and displayed that has graphical elements corresponding to the objects. Each graphical element has a size corresponding to a number and/or size of the portions in which the object to which the graphical element corresponds appears. The graphical elements have locations within the graphical diagram in correspondence with relationships of appearance of the objects within the portions. Selection of a point or area within the graphical diagram is received. Which of the graphical elements include the point or area are determined as one or more selected graphical elements corresponding to one or more selected objects. Which of the portions include all the selected objects are determined and output as one or more selected portions.

20 Claims, 6 Drawing Sheets

(56) References Cited

U.S. PATENT DOCUMENTS

2010/0104184 A1    4/2010    Bronstein et al.
2010/0111360 A1    5/2010    Sigal
2011/0072461 A1    3/2011    Moon et al.
2011/0103773 A1*  5/2011    Johnson et al. ............. 386/290

OTHER PUBLICATIONS

Ralha et al.; "Intelligent Mapping of Hyperspace", WI Proceedings IEEE/WIC International Conference on, Oct. 13-17, 2003, pp. 454-457.
Liu et al.; "An Interactive System for Video Content Exploration", Consumer Electronics, IEEE Transactions on, vol. 52, Iss. 4, Nov. 2006, pp. 1368-1376.
Yang et al.; "VIVO—A Video Indexing and Visualization Organizer", Proceedings, Digital Libraries, Joint Conference on May 27-31, 2003, p. 403.
Nuxeo DAM User Guide, "Browse and search assets," doc.nuxeo.com, added D. Renevy, last edited J. Zupan, Aug. 6, 2010.
H Agrawal, "Picasa 3.5 Released with Face Tagging Feature," www.shoutmeloud.com, Sep. 23, 2009.
Picasa and Picasa Web Albums help, "Name Tags: Add name tags in Picasa," picasa.google.com, Oct. 2, 2010.
R. Visser et al., "Object recognition for video retrieval," in Lecture Notes for Computer Science, year 2002.

* cited by examiner

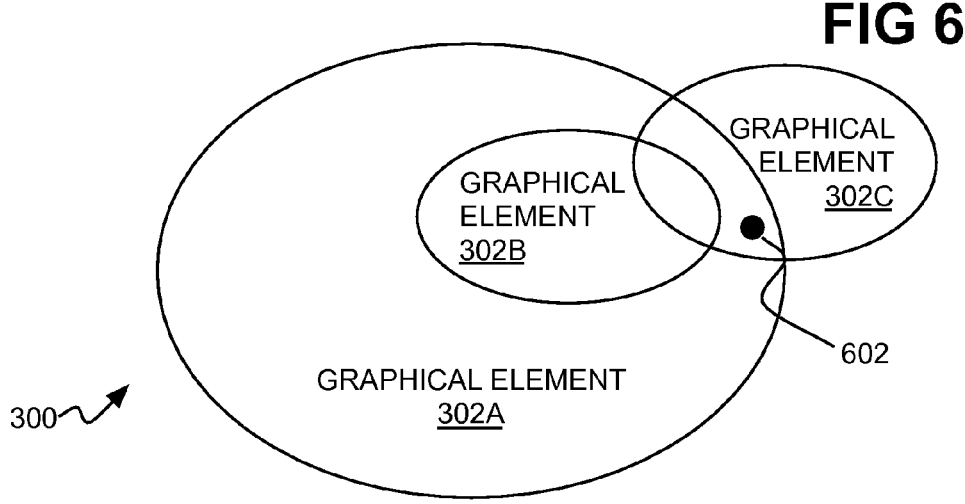
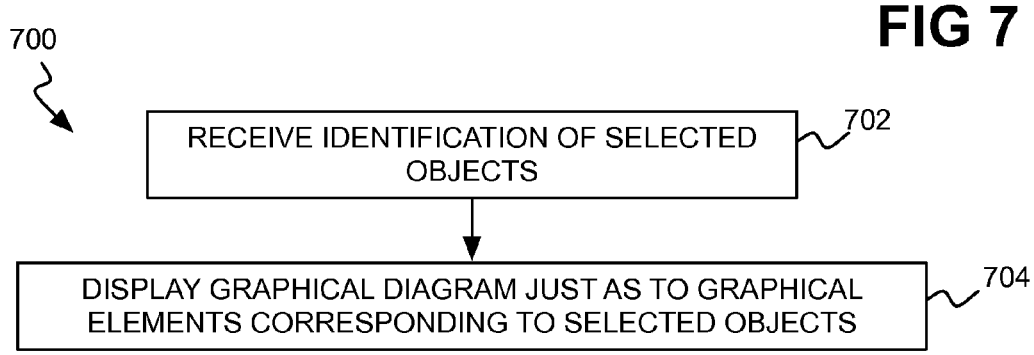
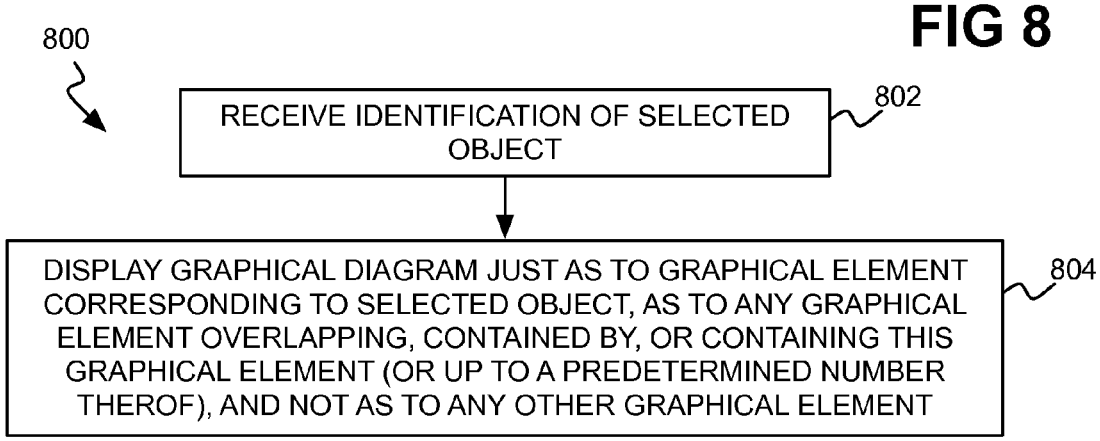

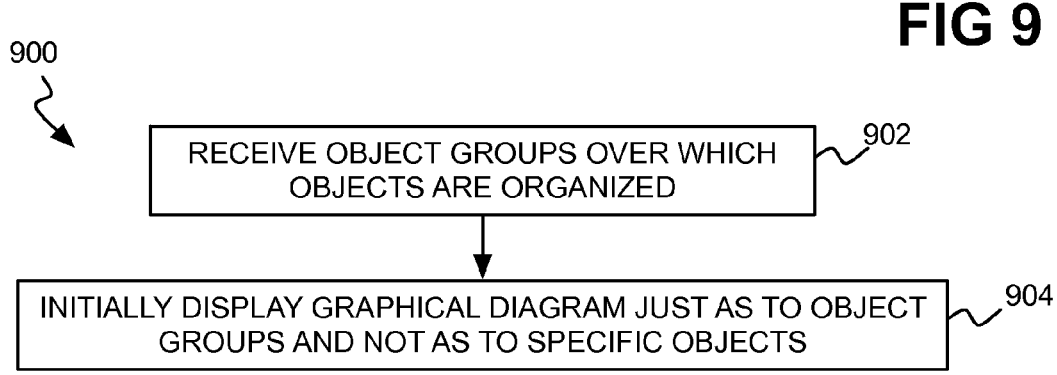
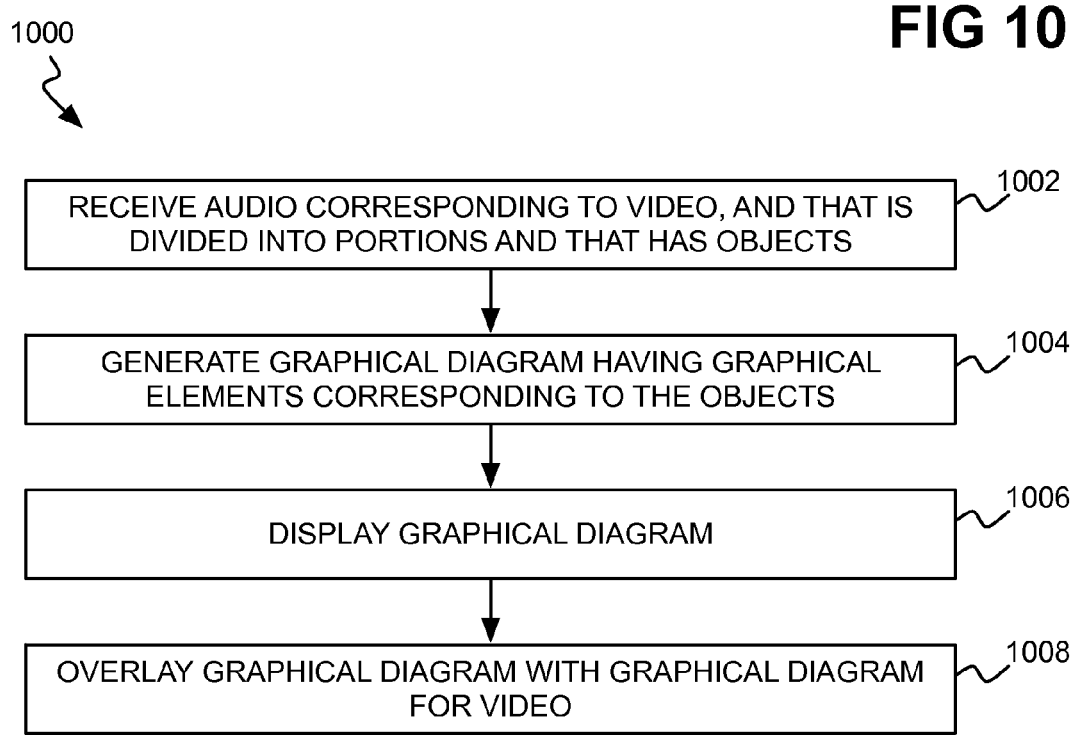

GRAPHICAL DIAGRAM HAVING ELEMENTS THAT CORRESPOND TO OBJECTS AND THAT HAVE LOCATIONS IN CORRESPONDENCE WITH APPEARANCE RELATIONSHIPS OF OBJECTS

BACKGROUND

Many users enjoy viewing video, including movies, television shows, documentaries, and other types of video. While at some times a user watch a complete video from start to finish, at other times the user may want to view just a particular portion of the video. The particular portion of the video of interest may be a specific scene in a movie, for instance.

SUMMARY

A method of an embodiment of the invention includes receiving, by a processor, a video divided into portions. The video has objects, and each object appears in one or more of the portions. The method includes generating, by the processor, a graphical diagram having graphical elements corresponding to the objects. Each graphical element has a size corresponding to a number and/or size of the portions in which the object to which the graphical element corresponds appears. The graphical elements have locations within the graphical diagram in correspondence with relationships of appearance of the objects within the portions. The method includes displaying, by the processor, the graphical diagram on a display device.

A computer program product of an embodiment of the invention includes a computer-readable storage medium having computer-readable code embodied therein. The computer-readable code is executable by a processor and includes first computer-readable code and second computer-readable code. The first computer-readable code is to display a graphical diagram on a display device. The graphical diagram has graphical elements corresponding to objects of a video. The video is divided into portions. Each object appears in one or more of the portions. Each graphical element has a size corresponding to a number and/or size of the portions in which the object to which the graphical element corresponds appears. The graphical elements have locations within the graphical diagram in correspondence with relationships of appearance of the objects within the portions. The second computer program code is to receive selection of a point or area within the graphical diagram. The second computer program code is to determine which of the graphical elements include the point or area, as one or more selected graphical elements corresponding to one or more selected objects. The second computer program code is to determine which of the portions include all the selected objects, as one or more selected portions, and is to output the selected portions.

A system of an embodiment of the invention includes a processor, a computer-readable data storage medium to store software executable by the processor, a database, a generation unit, and a selection unit. The database is to store a video divided into portions. The video has objects. Each object appears in one or more of the portions. The generation unit is implemented by the software to generate and display a graphical diagram having graphical elements corresponding to the objects. Each graphical element has a size corresponding to a number and/or size of the portions in which the object to which the graphical element corresponds appears. The graphical elements have locations within the graphical diagram in correspondence with relationships of appearance of the objects within the portions. The selection unit is implemented by the software to receive selection of a point or area within the graphical diagram. The selection unit is to determine which of the graphical elements include the point or area, as one or more selected graphical elements corresponding to one or more selected objects. The selection unit is to determine which of the portions include all the selected objects, as one or more selected portions, and is to output the selected portions.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 6 is a diagram of the graphical diagram of FIG. 3 in which a point has been selected, according to an embodiment of the invention.

FIGS. 7, 8, and 9 are flowcharts of methods for displaying the graphical diagram in conjunction with the method of FIG. 1, according to an embodiment of the present invention.

FIG. 10 is a flowchart of a method for displaying a graphical diagram that is performed in conjunction with the method of FIG. 1, according to an embodiment of the present invention.

DETAILED DESCRIPTION

Figure 1:
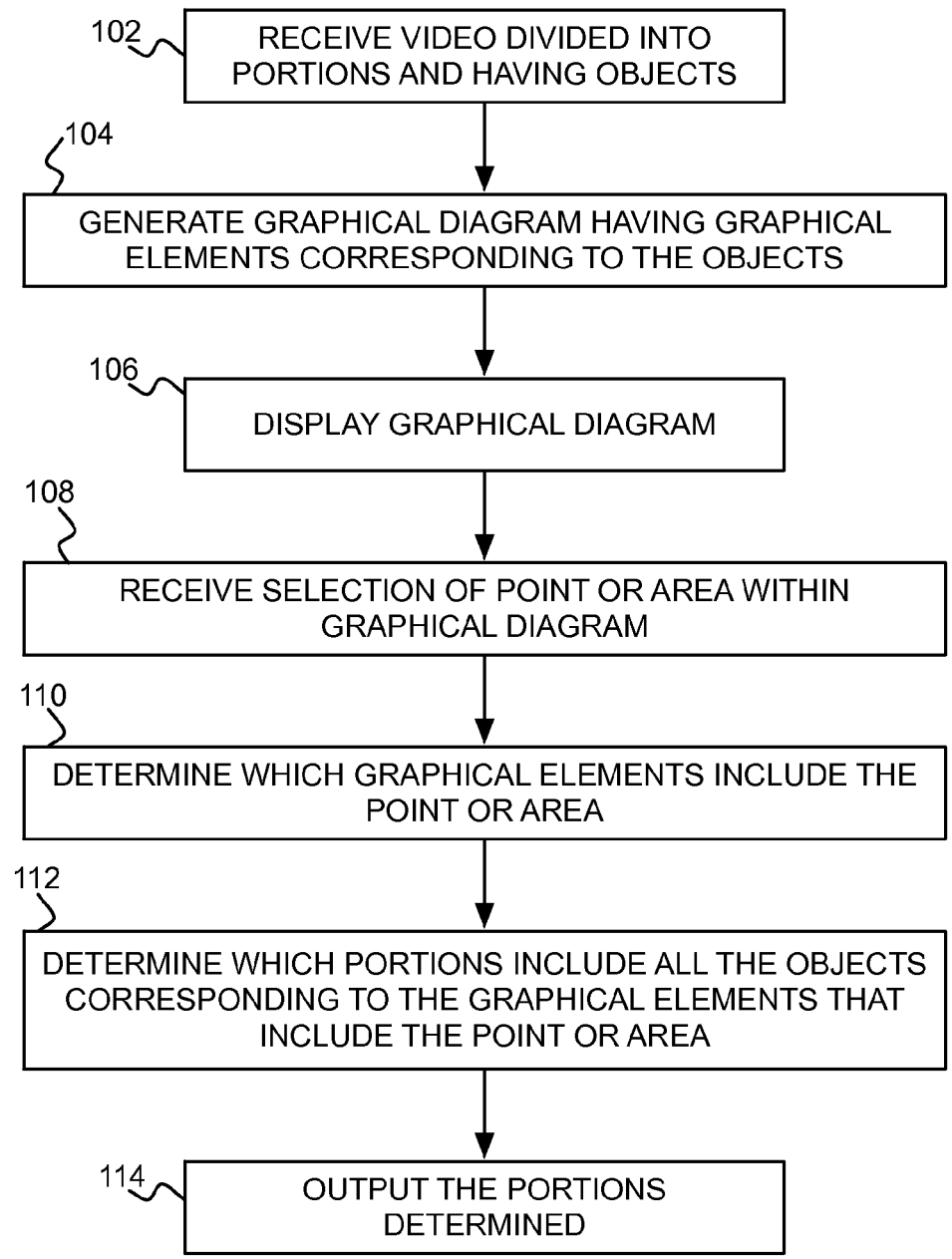
FIG. 1 is a flowchart of a method for displaying a graphical diagram by which portions of a video can be selected, according to an embodiment of the invention.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, at times a user may wish to view or locate just a particular portion of a video, such as a specific scene of a movie. There are a variety of existing techniques to achieve this functionality. For instance, a user may simply fast-forward at a very high speed through the video until he or she locates the desired portion. However, this can be tedious, and does not work if the user is interested in a portion of the video that has particular audio, such as specific dialogue, and so on.

Many digital versatile discs (DVDs) and other video sources also may permit specific scenes or other portions of videos to be selected. Generally, the scenes are arranged chronologically. However, the granularity of such prespecified scenes is typically not great enough to permit a user to select a desired portion of a video that may, for instance, be located in the middle of such a prespecified scene. Further, the user may have to know the general chronological location of his or her desired portion in order to be able to advantageously use such prespecified scenes to locate the desired portion.

By comparison, the techniques disclosed herein employ a graphical diagram that have graphical elements corresponding to objects that each appear in one or more portions of a video. The objects may be actors, actresses, and animals, as well as inanimate objects like buildings, cars, and so on. Each graphical element has a size corresponding to the number and/or size of portions in which the object to which the graphical element corresponds appears.

Furthermore, the graphical elements have locations within the graphical diagram in correspondence with relationships of appearance of the objects within the portions. For instance, where a first object that appears in video portions only with a second object, but where the second object also appears in video portions without the first object, the graphical element corresponding to the first object may be completely contained by the second object. As another example, where two objects appear in some video portions together, but appear separately in other video portions, the graphical elements corresponding to the objects may overlap.

A user can thus quickly view the graphical diagram, and select a video portion of interest by selecting a point or area within the diagram that is overlapped by one or more objects that the user remembers are present within the desired portion. The video portions that contain the object having graphical elements encompassing this point or area can then be displayed in thumbnail or summary form to the user. The user thus selects the video portion of interest for viewing. Various extensions to this general approach can also be implemented, a number of which are described below.

FIG. 1 shows a method 100, according to an embodiment of the invention. The method 100 is computer-implemented. For instance, the method 100 can be performed by a processor of a computing device executing a computer program from a computer-readable data storage medium of the computing device. The computing device can be a desktop or a laptop computer, or another type of computing device.

The processor receives a video that has been divided into portions, and that includes objects (102). The video may be a movie, a television show, or another type of video. The video may contain or be associated with audio, or not. The portions of the video may be scenes, grouping of frames, and other types of portions. The objects may be actors, actresses, animals, as well as inanimate objects like buildings and cars, and so on. The video is typically digital video, but may also be analog video.

Figure 2:
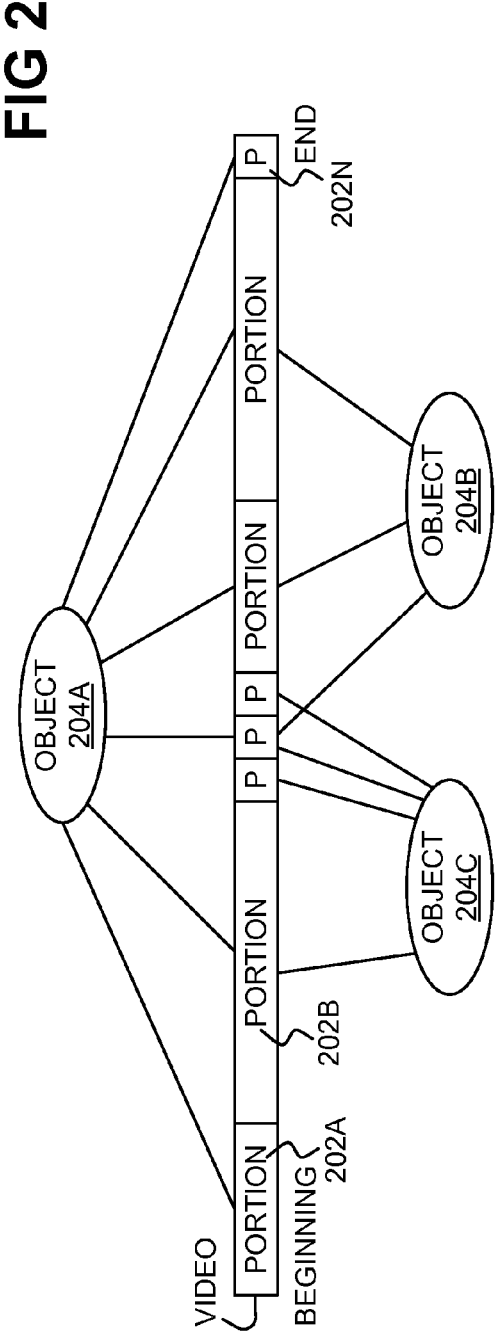
FIG. 2 is a diagram of a representative video divided into portions and having objects, according to an embodiment of the invention.

FIG. 2 shows a representative video 200, according to an embodiment of the invention. The video 200 has eight portions 202A, 202B, ..., 202N, collectively referred to as the portions 202, from the beginning of the video 200 to the end of the video 200. The portions 202 are chronologically arranged in the example of FIG. 2, are of varying size in the example of FIG. 2, are adjacent to one another and do not overlap in the example of FIG. 2, and represent in total the entirety of the video 200 in the example of FIG. 2. However, in other embodiments, the portions 202 may not adhere to one or more of these conditions.

There are three objects 204A, 204B, and 204C, collectively referred to as the objects 204, which appear in the video 200. The object 204A appears in six portions 202, the object 204B appears in three portions 202, and the object 204C appears in four portions 202. The object 204B does not appear in any portion 202 that the object 204A does not appear in. The object 204C appears in one portion 202 without either the object 204A or 204B, in two portions with just the object 204A, and in one portion 202 with both the objects 204A and 204B.

Referring back to FIG. 1, the processor generates a graphical diagram having graphical elements corresponding to the objects that each appear in one or more portions of the video (104). Each graphical element has a size corresponding to the number and/or size of the portions in which the object to which the graphical element corresponds appears. The graphical elements have locations within the graphical diagram in correspondence with the relationships of appearance of the objects within the portions of the video. That is, the graphical elements are arranged within the graphical diagram in relation to one another in correspondence with how the objects appear together or separately within the various portions of the video. The graphical elements may have the same or different shapes.

Figure 3:
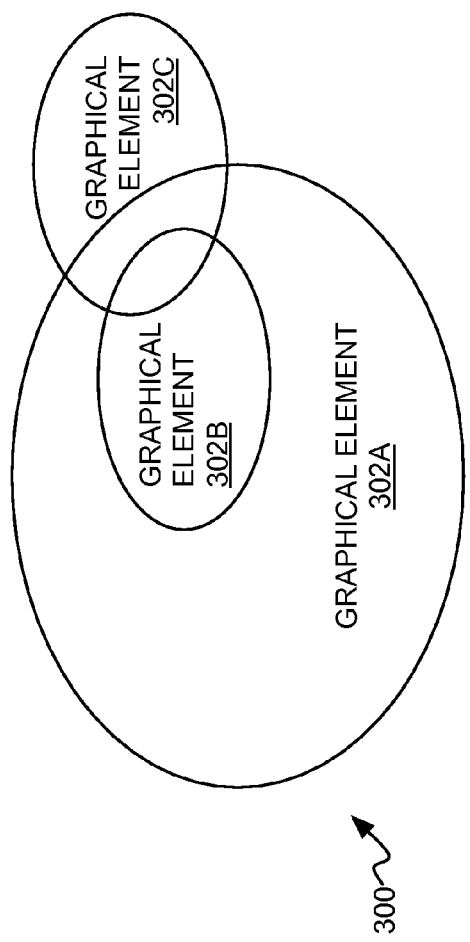
FIG. 3 is a diagram of a representative graphical diagram corresponding to the representative video of FIG. 2, according to an embodiment of the invention.

FIG. 3 shows a representative graphical diagram 300 that corresponds to the video 200 of FIG. 2, according to an embodiment of the invention. The graphical diagram 300 includes graphical elements 302A, 302B, and 302C, which are collectively referred to as the graphical elements 302. The graphical elements 302A, 302B, and 302C correspond to the objects 204A, 204B, and 204C of FIG. 2. In the example of FIG. 3, the size of each graphical element 302 corresponds to the number of portions 202 of FIG. 2 in which its corresponding object 204 appears within the video 200. As such, the graphical element 302A is larger than the graphical element 302C, which is larger than the graphical element 302B.

The locations of the graphical elements 302 within the graphical diagram 300 correspond to the relationships of appearance of the objects 204 within the portions 202 of the video 200 of FIG. 2. The graphical element 302B appears only in portions 202 in which the graphical element 302A also appears, but the graphical element 302A appears in other portions as well. Therefore, the graphical element 302A completely contains the graphical element 302B.

The graphical element 302C appears in some portions 202 by itself, in some portions 202 with just the graphical element 302A, and in some portions 202 with both the graphical elements 302A and 302B. Therefore, the graphical element 302C overlaps both the graphical elements 302A and 302B. The part of the graphical element 302C that does not overlap either graphical element 302A or 302B corresponds to the portions 202 in which the element 302C appears by itself. The part of the graphical element 302B that overlaps just the graphical element 302A but not the graphical element 302C corresponds to the portions 202 in which the element 302C appears just with the element 302A. The part of the graphical element 302B that overlaps both the graphical elements 302A and 302B corresponds to the portions 202 in which the element 302C appears with both the elements 302A and 302B.

Figure 4:
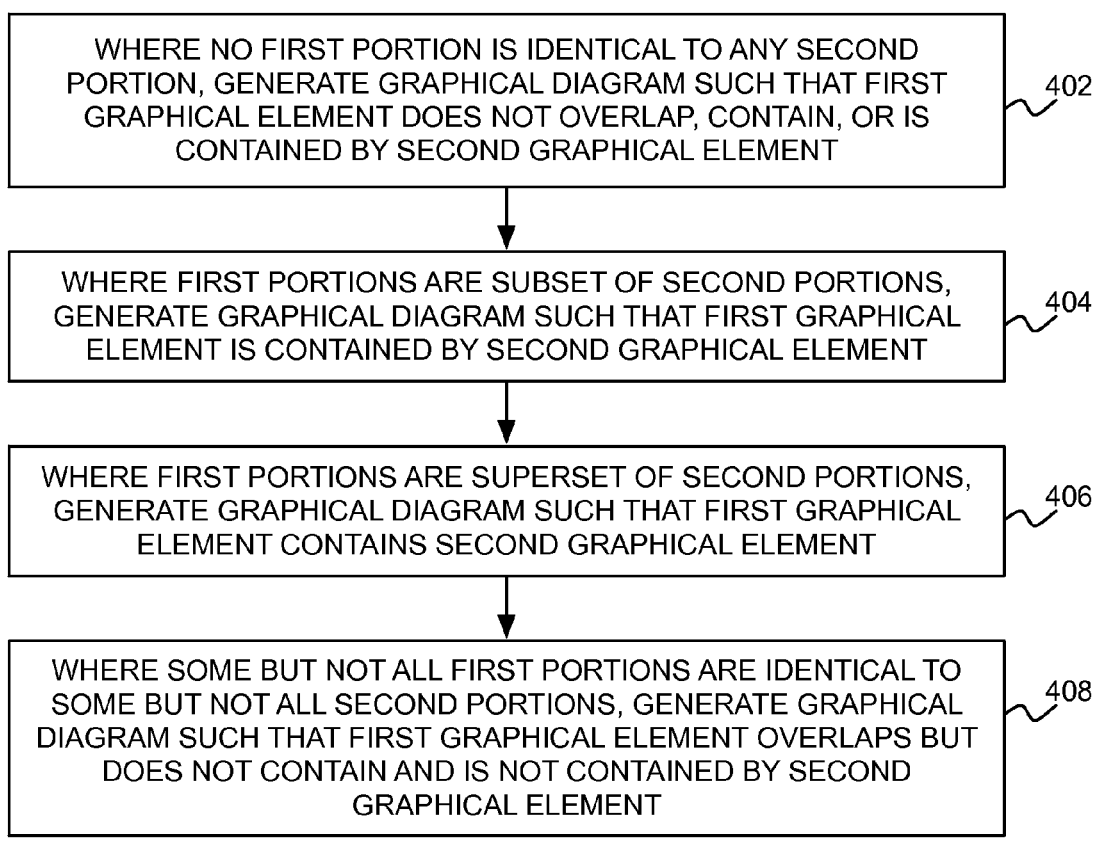
FIG. 4 is a flowchart of a method for how a graphical diagram can be partially generated, according to an embodiment of the invention.

FIG. 4 shows a method 400 detailing how the graphical diagram can be partially generated in part 106 of the method 100 of FIG. 1, according to an embodiment of the invention. The method 400 specifically shows how the graphical diagram can be generated for a first object in relation to a second object. The first object appears in one or more first portions of the video, and the second object appears in one or more second portions of the video. The method 400 generates a first graphical element for the first object, and a second graphical element for the second object. The method 400 thus can be repeated for each unique pair of objects appearing within the portions of the video.

Where none of the first portions are identical to any of the second portions, the graphical diagram is generated such that the first graphical element does not overlap the second graphical element (402). The graphical diagram is further generated in part 402 so that the first graphical element does not contain the second graphical element. The graphical diagram is also generated in part 402 so that the first graphical element is not contained by the second graphical element.

Where the first portions are a subset of the second portions, the graphical diagram is generated such that the second graphical element contains the first graphical element (404). That the first portions are a subset of the second portions means that each first portion is also a second portion, but there are one or more second portions that are not first portions. Where the first portions are a superset of the second portions, the graphical diagram is generated such that the first graphical element contains the second graphical element (406). That the first portions are a superset of the second portions means that each second portion is also a first portion, but there are one or more first portions that are not second portions.

Where some but not all of the first portions are identical to some but not all of the second portions, the graphical diagram is generated such that the first graphical element overlaps the second graphical element (408). However, the graphical diagram is generated in part 408 such that the first graphical element does not contain, and is not contained by, the second graphical element. The area of overlap between the first and second graphical elements has a size corresponding to a number and/or size of the first portions that are identical to the second portions.

Figure 5:
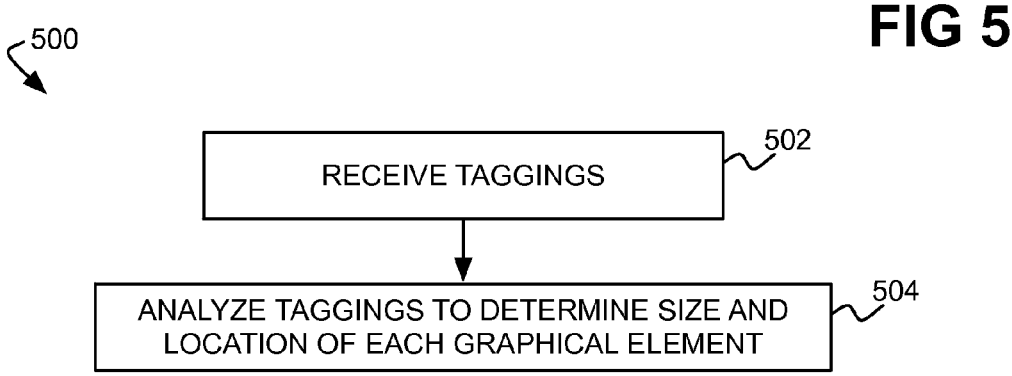
FIG. 5 is a flowchart of a method for how a graphical diagram can be partially generated, according to another embodiment of the invention.

FIG. 5 shows a method 500 detailing how the graphical diagram can be partially generated in part 106 of the method 100 of FIG. 1, according to another embodiment of the invention. The method 500 is typically performed in conjunction with the method 400 of FIG. 4. The method 500 receives taggings (502). Each tagging associates an object with a portion of the video in which the object appears. Therefore, the taggings provide the manner by which it is known which objects appear in which video portions.

The taggings are analyzed to determine the size and the location of each graphical element within the graphical diagram (504). For instance, the method 400 of FIG. 4 can be performed in this respect. For each unique pair of objects, for example, the taggings for the objects can be analyzed to determine which of parts 402, 404, 406, and 408 of the method 400 is applicable to the pair of objects in question.

Referring back to FIG. 1, once the graphical diagram has been generated, the processor displays the graphical diagram on a display device (106). Thereafter, the processor receives the selection of a point or area within the graphical diagram (108). For instance, a user may employ a graphical user interface to select a point or area, such as by moving a pointer over the point or area and performing a selection action like clicking a mouse button, by tapping the point or area using a touchscreen, and so on.

The processor determines which graphical elements include the point or area that has been selected (110). These graphical elements are referred to herein as the selected graphical elements, and there may be one or more such graphical elements. Each selected graphical element in turn corresponds to an object that is referred to as a selected object, such that there may be one or more selected objects.

The processor determines which portions of the video include all the selected objects (112). There are one or more such video portions, which are referred to as the selected portions of the video. The processor outputs the selected portions of the video (114). Such output can include playing back the selected portions. Such output can also include displaying thumbnail representations of the selected portions, and permitted a user to select which of these selected portions to play back.

FIG. 6 shows the representative graphical diagram 300 of FIG. 3 in relation to which example performance of parts 108, 110, 112, and 114 of the method 100 of FIG. 1 are described, according to an embodiment of the invention. In FIG. 6, a point 602 has been selected. In part 108, the selection of this point 602 is received. In part 110, it is determined that graphical elements 302A and 302C, but not the graphical element 302B, include the point 602. In part 112, the (one) portion 202 of the video 200 in which the objects 204A and 204C corresponding to the elements 302A and 302C appear together without the object 204B corresponding to the element 302B is determined. In part 114, this portion 202 of the video 200 are output.

The general approach that has been described permits a user to easily select portions of video of interest, based on the user's knowledge of which objects appear in the desired portions. By inspecting the graphical diagram and by making an appropriate selection within the graphical diagram, the user effectively selects portions of video that contain the objects that the user has in mind. The user can select more than one point or area within the graphical diagram, such that the union of the determined video portions for each point or area represents the portions of interest.

For example, in FIG. 6, the user may be interested in any video portion that includes both the object 204C to which the graphical element 302C corresponds and the object 204A to which the graphical element 302A corresponds. As such, besides the point 602, the user may select a point within the area of graphical diagram 300 that all three graphical elements 302 overlap. As such, two video portions 202 are identified: one in which all three objects 204 appear, and one in which just the objects 204A and 204C appear.

That a point is selected in a graphical diagram means that an area that corresponds to a unique overlap of one or more of the graphical elements with this point is selected. For example, in FIG. 6, the point 602 is within an area that just the graphical elements 302A and 302C overlap. Therefore, any point within this area effectively selects the same two graphical elements 302A and 302C. The selection of any such point means that the unique area of the graphical diagram 302 in which just the two graphical elements 302A and 302C overlap is selected.

The general approach that has been described is applicable to any number of objects within any number of portions of any type of video. However, as the number of objects increases, the complexity of the resulting graphical diagram does, too. At some point, it may become difficult for a user to easily discern the various graphical elements within the graphical diagram, and to appropriately select point or areas within the diagram. To alleviate this, the graphical diagram may be able to be zoomed in and out of, so that the user can locate a desired intersection or overlap of the graphical elements.

FIGS. 7, 8, and 9 show methods 700, 800, and 900, respectively, of other approaches to compensate for too many objects, according to varying embodiments of the invention. The methods 700, 800, and 900 are each performed in conjunction with the method 100 of FIG. 1. As such, the processor that performs the method 100 can perform the methods 700, 800, and 900, too.

In FIG. 7, the processor receives identification of a number of selected objects (702). For instance, a user may be presented with a list of all the objects that are present within the video, and is able to select a number of these objects. As another example, a predetermined number of the objects that appear most within the video may be selected. The graphical diagram is then displayed in part 106 of the method 100 of FIG. 1 just as to the graphical elements corresponding to the selected objects (704), and not the graphical element corresponding to any other object. Which objects are selected can be changed as desired, so that the display of part 704 is dynamic.

In FIG. 8, the processor receives identification of a selected object (802). As before, a user may select this object from the list of all objects that appear within the video, or the object that appears most within the video may be selected. The graphical diagram is then displayed in part 106 of the method 100 of FIG. 1 just as to the graphical element corresponding to this object and as to any graphical element overlapping, contained by, or containing this graphical element (or up to a predetermined number of such graphical elements), and not as to any other graphical element (804).

For example, the predetermined number of graphical elements may be ten. If no more than ten graphical elements overlap, contain, or are contained by the graphical element corresponding to the selected object, then all these graphical elements are displayed in part 804. However, if there are more than ten such graphical elements, then just ten of them are displayed in part 804. For instance, if there are ninety such graphical elements, then the ten graphical elements corresponding to objects having the greatest frequency of appearance within the video may be displayed in part 804.

In FIG. 9, the processor receives object groups over which the objects are organized (902). The object groups may be classified over a hierarchy. For instance, the first level of organization may divide person objects from non-person objects. In the second level of organization, the person objects may be divided between actors and actresses, and the non-person objects may be divided into animate objects, like animals, and non-animate objects, like buildings and cars.

The graphical diagram is then displayed in part 106 of the method 100 of FIG. 1 initially just as to the object groups, and not as to specific objects (904). The graphical elements in part 904 correspond to object groups instead of objects. A user can then "drill down" into particular object groups, such as by selecting the graphical element corresponding to a desired object group, to see the graphical elements corresponding to the objects that the selected group contains. As such, the amount of information displayed to the user is general at first, and becomes more specific as the user effectively selects object groups and particular objects.

A video typically has corresponding or associated audio. For instance, a movie includes both video—i.e., moving pictures—as well as audio, such as dialog, sound effects, and so on. That the objects appear in a video can mean that the objects appear in just the video itself, just in the audio corresponding to the video, or both in the audio and the video. An actor, for instance, may appear in a portion of the video in which he is not speaking. Similarly, an actress may appear in a portion in which she is speaking but is not seen.

FIG. 10 shows a method 1000 of an approach to treat the audio corresponding to or associated with the video differently from the video itself, according to an embodiment of the invention. The method 1000 is performed in conjunction with the method 100 of FIG. 1. As such, the processor that performs the method 100 can perform the method 1000 as well.

The processor receives audio corresponding to the video (1002), such as at the same time the processor receives the video in part 102 of the method 100 of FIG. 1. The audio is divided into portions, which may be correspond to or not correspond to the portions into which the video is itself divided. The objects also appear in the audio portions. A given object may appear in a video portion but not in a corresponding audio portion, in an audio portion but not in a corresponding video portion, or in both the video and audio portions in question, depending on whether the object is just seen, is just heard, or is both seen and heard in the portion in question.

The processor generates another graphical diagram having graphical elements corresponding to the objects (1004), as in part 104 of the method 100 of FIG. 1. However, the difference between parts 104 and 1004 is that in the former, the graphical diagram pertains to the presence or appearance of objects within video portions, whereas in the latter, the graphical diagram pertains to the presence or appearance of objects within audio portions. As such, two graphical diagrams are ultimately generated in performing the method 1000 in conjunction with the method 100.

The processor can display this additionally generated graphical diagram (1006). Furthermore, the processor can overlap the graphical diagram for the audio portions with the graphical diagram for the video portions (1008). In relation to parts 1006 and 1008, the processor can then perform parts 108, 110, 112, and 114 of the method 100 of FIG. 1. That is, a point or area may be selected within the graphical diagram pertaining to video, within the graphical diagram pertaining to audio, or within the overlay of these two diagrams.

Figure 11:
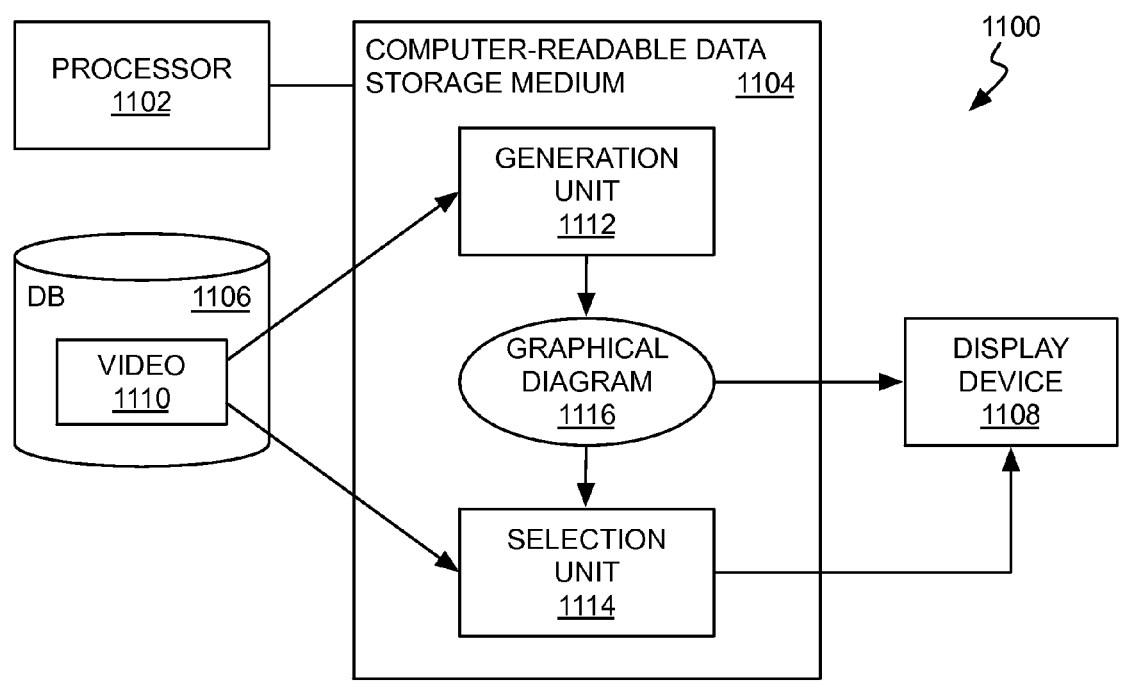
FIG. 11 is a diagram of a system, according to an embodiment of the present invention.

FIG. 11 shows a system 1100, according to an embodiment of the invention. The system 1100 can be implemented as one or more computing devices, such as one or more desktop or laptop computers, among other types of computing devices. The system 1100 can include a processor 1102, a computer-readable data storage medium 1104, a database 1106, and/or a display device 1108. The system 1100 can include other components as well, such as input devices, network devices, and so on.

The computer-readable data storage medium 1104 is implemented as a volatile or a non-volatile storage device, such as a semiconductor memory or a hard disk drive. The database 1106 may be implemented on the same computer-readable data storage medium 1104, or as a different computer-readable data storage medium. The database 1106 stores video 1110 that is divided into portions and that contains objects, as has been described above.

The computer-readable data storage medium 1104 is communicatively connected to the processor 1102, and stores software implementing a generation unit 1112 and a selection unit 1114. The processor 1102 executes the software to effectuate the functionality of the units 1112 and 1114. In this respect, it can be said that the units 1112 and 1114 can also be implemented in hardware, insofar as the processor 1102 and the computer-readable data storage medium 1104 are each hardware.

The generation unit 1112 receives the video 1110 from the database 1106, and correspondingly generates a graphical diagram 1116, as has been described, which is displayed on the display device 1108. The selection unit 1114 receives a selection of a point or area within the graphical diagram 1116, and displays the corresponding portions of the video 1110 on the display device 1108, as has also been described. As such, the units 1112 and 1114 perform the various methods that have been presented above.

Those of ordinary skill within the art can appreciate that a system, method, or computer program product may embody aspects of the present disclosure. Accordingly, aspects of the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product that one or more computer readable medium(s) embody. The computer readable medium(s) may embody computer readable program code.

Those of ordinary skill within the art can utilize any combination of one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. An appropriate medium may transmit program code embodied on a computer readable medium. Such appropriate media include but are not limited to wireless, wireline, optical fiber cable, RF, etc., or any suitable combination of the foregoing.

In general, a computer program product includes a computer-readable medium on which one or more computer programs are stored. One or more processors of one or more hardware devices execute the computer programs from the computer-readable medium to perform a method. For instance, the processors may perform one or more of the methods that have been described above.

The computer programs themselves include computer program code. Those of ordinary skill within the art may write computer program code for carrying out operations for aspects of the present disclosure in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, any type of network may connect the remote computer to the user's computer. Such networks include a local area network (LAN) or a wide area network (WAN), or a connection may to an external computer (for example, through the Internet using an Internet Service Provider).

The detailed description has presented aspects of the present disclosure with reference to flowchart illustrations and/or block diagrams of methods, apparatus (systems) and computer program products according to embodiments of the disclosure. Those of ordinary skill within the art can understand that computer program instructions can implement each block of the flowchart illustrations and/or block diagrams, and combinations of blocks in the flowchart illustrations and/or block diagrams. Providing these instructions to a processor of a general purpose computer, special purpose computer, or other programmable data processing apparatus to produce a machine, can result in execution of the instructions via the processor of the computer or other programmable data processing apparatus, to create means for implementing the functions/acts specified in the flowchart and/or block diagram block or blocks.

A computer readable medium may also store these instruction to direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Those of ordinary skill within the art may also load the computer program instructions onto a computer, other programmable data processing apparatus, or other devices to cause the computer, other programmable apparatus or other devices, to perform a series of operational steps. The result is a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, execution of two blocks shown in succession may, in fact, occur substantially concurrently, or sometimes in the reverse order, depending upon the functionality involved. Special purpose hardware-based systems that perform specified functions or acts, or combinations of special purpose hardware and computer instructions, can implement each block of the block diagrams and/or flowchart illustration, and combinations of blocks in the block diagrams and/or flowchart illustration.

Although the detailed description has presented specific embodiments, those of ordinary skill in the art can appreciate that they can substitute any arrangement calculated to achieve the same purpose for the specific embodiments shown. This application thus covers any adaptations or variations of embodiments of the present disclosure. As such and therefore, only the claims and equivalents thereof limit this disclosure.

We claim:

1. A method comprising:
   receiving, by a processor, a video divided into a plurality of portions, the video having a plurality of objects, each object appearing in one or more of the portions;
   generating, by the processor, a graphical diagram having a plurality of graphical elements corresponding to the objects, each graphical element having a size corresponding to a number and/or size of the portions in which the object to which the graphical element corresponds appears, the graphical elements having locations within the graphical diagram in correspondence with relationships of appearance of the objects within the portions; and,
   displaying, by the processor, the graphical diagram on a display device.

2. The method of claim 1, wherein the objects comprise a first object appearing in one or more first portions of the portions of the video and a second object appearing in one or more second portions of the portions of the video, the graphical elements comprise a first graphical element corresponding to the first object and a second graphical element corresponding to the second object, and generating the graphical diagram comprises:
   where none of the first portions are identical to any of the second portions, generating the graphical diagram such that the first graphical element does not overlap the second graphical element, the first graphical element does not contain the second graphical element, and the second graphical element does not contain the first graphical element;
   where the first portions are a subset of the second portions, generating the graphical diagram such that the second graphical element contains the first graphical element;
   where the first portions are a superset of the second portions, generating the graphical diagram such that the first graphical element contains the second graphical element; and,
   where some but not all of the first portions are identical to some but not all of the second portions, generating the graphical diagram such that the first graphical element overlaps the second graphical element but is not contained by and does not contain the second graphical element, an area of overlap between the first graphical element and the second graphical element having a size corresponding to a number and/or size of the first portions that are identical to the second portions.

3. The method of claim 1, wherein generating the graphical diagram comprises:
   receiving a plurality of taggings, each tagging associating one of the objects as appearing in one of the portions; and,
   analyzing the taggings to determine the size and the location of each graphical element within the graphical diagram.

4. The method of claim 1, wherein the portions are first portions, the graphical diagram is a first graphical diagram, the graphical elements are first graphical elements, and wherein the method further comprises:
   receiving, by the processor, audio corresponding to the video, the audio divided into a plurality of second portions, the audio having the objects, each object appearing in one or more of the second portions;
   generating, by the processor, a second graphical diagram having a plurality of second graphical elements corresponding to the objects, each second graphical element having a size corresponding to a number and/or size of the second portions in which the object to which the second graphical element corresponds appears, the second graphical elements having locations within the second graphical diagram in correspondence with relationships of appearance of the objects within the second portions; and,
   displaying, by the processor, the second graphical diagram on the display device.

5. The method of claim 4, further comprising overlaying the first graphical diagram and the second graphical diagram.

6. The method of claim 1, further comprising:
   receiving selection of a point or area within the graphical diagram;
   determining which of the graphical elements include the point or area, as one or more selected graphical elements corresponding to one or more selected objects;
   determining which of the portions include all the selected objects, as one or more selected portions; and,
   outputting the selected portions.

7. The method of claim 6, wherein outputting the selected portions comprises one or more of:
   playing back the selected portions of the video;
   displaying thumbnail representations of the selected portions of the video, and permitting a user to select which of the selected portions to play back.

8. The method of claim 1, further comprising receiving identification of a sub-plurality of selected objects of the objects,
   wherein displaying the graphical diagram comprises displaying the graphical diagram just as to the graphical elements corresponding to the selected objects and not as to any other graphical element.

9. The method of claim 1, further comprising receiving identification of a selected object of the objects,
   wherein displaying the graphical diagram comprises displaying the graphical diagram just as to the graphical element corresponding to the selected object and as to any graphical element overlapping, contained by, or containing the graphical element corresponding to the selected object, and not as to any other graphical element.

10. The method of claim 1, further comprising receiving identification of a selected object of the objects,
    wherein displaying the graphical diagram comprises displaying the graphical diagram just as to the graphical element corresponding to the selected object and up to a predetermined number of the graphical elements that each overlap, is contained by, or contains the graphical element corresponding to the selected object, and not as to any other graphical element.

11. The method of claim 1, wherein the objects are organized over a plurality of object groups,
wherein displaying the graphical diagram comprises initially displaying the graphical diagram just as to the object groups as opposed to the objects.

12. A computer program product comprising:
a storage device having computer-readable code embodied therein, the computer-readable code executable by a processor and comprising:
first computer-readable code to display a graphical diagram on a display device, the graphical diagram having a plurality of graphical elements corresponding to a plurality of objects of a video, the video divided into a plurality of portions, each object appearing in one or more of the portions, each graphical element having a size corresponding to a number and/or size of the portions in which the object to which the graphical element corresponds appears, the graphical elements having locations within the graphical diagram in correspondence with relationships of appearance of the objects within the portions;
second computer program code to receive selection of a point or area within the graphical diagram, to determine which of the graphical elements include the point or area, as one or more selected graphical elements corresponding to one or more selected objects, to determine which of the portions include all the selected objects, as one or more selected portions, and to output the selected portions.

13. The computer program product of claim 12, wherein the objects comprise a first object appearing in one or more first portions of the portions of the video and a second object appearing in one or more second portions of the portions of the video, the graphical elements comprise a first graphical element corresponding to the first object and a second graphical element corresponding to the second object, and:
where none of the first portions are identical to any of the second portions, the first graphical element does not overlap the second graphical element within the graphical diagram, the first graphical element does not contain the second graphical element within the graphical diagram, and the second graphical element does not contain the first graphical element within the graphical diagram;
where the first portions are a subset of the second portions, the second graphical element contains the first graphical element within the graphical diagram;
where the first portions are a superset of the second portions, the first graphical element contains the second graphical element within the graphical diagram; and,
where some but not all of the first portions are identical to some but not all of the second portions, the first graphical element overlaps the second graphical element within the graphical diagram but is not contained by and does not contain the second graphical element within the graphical diagram, an area of overlap between the first graphical element and the second graphical element within the graphical diagram having a size corresponding to a number and/or size of the first portions that are identical to the second portions.

14. The computer program product of claim 12, wherein the first computer program code is to receive identification of a sub-plurality of selected objects of the objects, and is to display the graphical diagram just as to the graphical elements corresponding to the selected objects and not as to any other graphical element.

15. The computer program product of claim 12, wherein the first computer program code is to receive identification of a selected object of the objects, and is to display the graphical diagram just as to the graphical element corresponding to the selected object and as to any graphical element overlapping, contained by, or containing the graphical element corresponding to the selected object, and not as to any other graphical element.

16. The computer program product of claim 12, wherein the first computer program code is to receive identification of a selected object of the objects, and is to display the graphical diagram just as to the graphical element corresponding to the selected object and up to a predetermined number of the graphical elements that each overlap, is contained by, or contains the graphical element corresponding to the selected object, and not as to any other graphical element.

17. A system comprising:
a processor;
a computer-readable data storage medium to store software executable by the processor;
a database to store a video divided into a plurality of portions, the video having a plurality of objects, each object appearing in one or more of the portions;
a generation unit implemented by the software to generate and display a graphical diagram having a plurality of graphical elements corresponding to the objects, each graphical element having a size corresponding to a number and/or size of the portions in which the object to which the graphical element corresponds appears, the graphical elements having locations within the graphical diagram in correspondence with relationships of appearance of the objects within the portions; and,
a selection unit implemented by the software to receive selection of a point or area within the graphical diagram, to determine which of the graphical elements include the point or area, as one or more selected graphical elements corresponding to one or more selected objects, and to determine which of the portions include all the selected objects, as one or more selected portions, and to output the selected portions.

18. The system of claim 17, wherein the objects comprise a first object appearing in one or more first portions of the portions of the video and a second object appearing in one or more second portions of the portions of the video, the graphical elements comprise a first graphical element corresponding to the first object and a second graphical element corresponding to the second object, and generating the graphical diagram comprises:
where none of the first portions are identical to any of the second portions, the generation unit is to generate the graphical diagram such that the first graphical element does not overlap the second graphical element, the first graphical element does not contain the second graphical element, and the second graphical element does not contain the first graphical element;
where the first portions are a subset of the second portions, the generation unit is to generate the graphical diagram such that the second graphical element contains the first graphical element;
where the first portions are a superset of the second portions, the generation unit is to generate the graphical diagram such that the first graphical element contains the second graphical element; and,
where some but not all of the first portions are identical to some but not all of the second portions, the generation unit is to generate the graphical diagram such that the first graphical element overlaps the second graphical element but is not contained by and does not contain the second graphical element, an area of overlap between the first graphical element and the second graphical element having a size corresponding to a number and/or size of the first portions that are identical to the second portions.

19. The system of claim 17, wherein one or more of:

the generation unit is to receive identification of a sub-plurality of selected objects of the objects, and is to display the graphical diagram just as to the graphical elements corresponding to the selected objects and not as to any other graphical element, the objects are organized over a plurality of object groups, and the generation unit is to display the graphical diagram just as to the object groups as opposed to the objects.

20. The system of claim 17, wherein the generation unit is to receive identification of a selected object of the objects, and is to one or more of:

display the graphical diagram just as to the graphical element corresponding to the selected object and as to any graphical element overlapping, contained by, or containing the graphical element corresponding to the selected object, and not as to any other graphical element;

display the graphical diagram just as to the graphical element corresponding to the selected object and up to a predetermined number of the graphical elements that each overlap, is contained by, or contains the graphical element corresponding to the selected object, and not as to any other graphical element.

* * * * *